(12) United States Patent
Choi (10) Patent No.: US 12,202,387 B2
(45) Date of Patent: Jan. 21, 2025

(54) SEAT RAIL LOCKING DEVICE

(71) Applicant: DAS CO., LTD, Gyeongju-si (KR)

(72) Inventor: Young Il Choi, Hwaseong-si (KR)

(73) Assignee: DAS CO., LTD., Hwaseong-si (KR)

( * ) Notice: Subject to any disclaimer, the term of this patent is extended or adjusted under 35 U.S.C. 154(b) by 113 days.

(21) Appl. No.: 18/077,526

(22) Filed: Dec. 8, 2022

(65) Prior Publication Data

US 2023/0406164 A1 Dec. 21, 2023

(30) Foreign Application Priority Data

Jun. 15, 2022 (KR) .......................... 10-2022-0073013

(51) Int. Cl.
*B60N 2/08* (2006.01)
*B60N 2/07* (2006.01)

(52) U.S. Cl.
CPC ......... *B60N 2/0806* (2013.01); *B60N 2/0715* (2013.01)

(58) Field of Classification Search
CPC ...... B60N 2/0806; B60N 2/0715; B60N 2/06; B60N 2/12; B60N 2/2209
USPC ...................................................... 297/344.1
See application file for complete search history.

(56) References Cited

U.S. PATENT DOCUMENTS

| | | | |
|---|---|---|---|
| 6,637,712 B1* | 10/2003 | Lagerweij | B60N 2/0887 296/64 |
| 10,363,839 B2 | 7/2019 | Fukuda et al. | |
| 2004/0026975 A1* | 2/2004 | Rausch | B60N 2/0715 297/344.1 |
| 2013/0076085 A1* | 3/2013 | Speck | B60N 2/427 297/216.1 |
| 2013/0112833 A1* | 5/2013 | Kim | B60N 2/0875 248/429 |

(Continued)

FOREIGN PATENT DOCUMENTS

| | | |
|---|---|---|
| DE | 202008000324 U1 | 4/2008 |
| DE | 102016119490 A1 | 4/2017 |

(Continued)

OTHER PUBLICATIONS

DE Office Action for corresponding DE application No. 102022213260. 2, dated Oct. 8, 2023, pp. 1-9.

(Continued)

*Primary Examiner* — Jose V Chen
(74) *Attorney, Agent, or Firm* — Tarolli, Sundheim, Covell & Tummino LLP (57) ABSTRACT

The present disclosure relates to a seat rail locking device that fixes a seat after the seat has moved in a fore and aft direction of a vehicle. The seat rail locking device includes a guide bracket provided in the moving rail, a pair of locking units supported by the guide bracket, configured to move in an upward and downward direction, and arranged in the longitudinal direction, each locking unit comprising a plurality of locks selectively engaged with the fixing locks, and a fixing bracket configured to fix the locking unit to the moving rail. With this configuration, it is possible to prevent a play between the locks and the fixing locks from occurring at locations where the locks of the lock unit provided in the moving rail are engaged with and locked to the fixing locks provided in the fixed rail. Further, it is possible to prevent BSR noise and damage to parts from occurring.

6 Claims, 10 Drawing Sheets

(56) References Cited

U.S. PATENT DOCUMENTS

| | | | |
|---|---|---|---|
| 2014/0224954 A1* | 8/2014 | Oh | B60N 2/0818 |
| | | | 248/429 |
| 2014/0263920 A1* | 9/2014 | Anticuar | B60N 2/0715 |
| | | | 248/429 |
| 2015/0217661 A1* | 8/2015 | Takiya | B60N 2/0818 |
| | | | 248/429 |
| 2016/0039314 A1* | 2/2016 | Anticuar | B60N 2/0715 |
| | | | 248/429 |
| 2016/0185260 A1* | 6/2016 | Kim | B60N 2/0856 |
| | | | 248/309.2 |
| 2017/0036568 A1* | 2/2017 | Kumagai | B60N 2/0806 |
| 2019/0241098 A1 | 8/2019 | Anticuar et al. | |
| 2020/0331364 A1* | 10/2020 | Hsi | B60N 2/0806 |
| 2020/0391620 A1* | 12/2020 | Krpo | B60N 2/0875 |
| 2021/0046851 A1* | 2/2021 | Spagnoli | B60N 2/682 |
| 2021/0129710 A1* | 5/2021 | Petit | B60N 2/0818 |
| 2021/0245632 A1* | 8/2021 | Spagnoli | B60N 2/0887 |
| 2022/0118887 A1* | 4/2022 | Chen | B60N 2/0727 |
| 2023/0001827 A1* | 1/2023 | Hwang | B60N 2/0881 |
| 2024/0101011 A1* | 3/2024 | Park | B60N 2/0715 |

FOREIGN PATENT DOCUMENTS

| | | |
|---|---|---|
| KR | 10-1206802 A | 10/2012 |
| KR | 10-1316994 A | 7/2013 |
| KR | 10-2071488 A | 1/2020 |

OTHER PUBLICATIONS

Korean Office Action for KR application No. 10-2022-0073013, dated Mar. 22, 2024, 5 pages.

* cited by examiner

SEAT RAIL LOCKING DEVICE

CROSS REFERENCE TO RELATED APPLICATION

The present application claims priority to Korea Patent Application No. 10-2022-0073013, filed Jun. 15, 2022, the entire contents of which is incorporated herein for all purposes by this reference.

BACKGROUND

Field

The present disclosure relates to a seat rail locking device, and more particularly, to a seat rail locking device for fixing a seat after the seat has moved in a fore and aft direction of a vehicle.

Description of the Related Art

In general, a seat of a vehicle includes a seat back for supporting the load of the upper body of an occupant, and a seat cushion for supporting the load of the lower body, such as hips and thighs.

In addition, the seat is installed to slidably move within a certain distance in a fore and aft direction of a vehicle body to conform to the body shape of the occupant and efficient use of an interior space, and the movement of the seat is enabled by the seat rail. The seat rail includes a lower rail fixedly installed in a longitudinal direction on a floor panel corresponding to an indoor floor, and an upper rail coupled to slidably move along the lower rail and fixed to a lower portion of a seat cushion.

The upper rail is configured to be fixed at the position after the upper rail has moved a certain distance along the lower rail. To this end, the seat rail is provided with a locking device for fixing the position of the upper rail with respect to the lower rail.

Korean Patent Registration No. 10-1407259 discloses a conventional seat rail locking device for a vehicle. The conventional seat rail locking device is configured such that a locking pin provided in a moving rail is inserted into a hole formed in a fixed rail to achieve locking.

As described above, in the conventional seat rail locking device, the hole is formed to be larger than the diameter of the locking pin such that the locking pin can be well inserted into the hole formed in the fixed rail, so that a certain amount of play occurs.

However, as in the prior art, a play occurs when the locking pin is inserted into the hole, resulting in a problem that BSR (Buzz, Squeak and Rattle) noise is caused according to vibration occurring in the vehicle. In addition, there is a problem that the locking pin or the lower rail is damaged by the repeated collision of the locking pin.

SUMMARY

The present disclosure has been devised to solve the above problems, and an object of the present disclosure is to provide a rail locking device in which there is no play between a lock and a fixing lock at a position where the lock of a lock unit provided on a moving rail is engaged with and locked to the fixing lock provided on the fixed rail.

In order to achieve the above object, the present disclosure relates to a seat rail locking device which is provided on a moving rail moving along a fixed rail and is engaged with fixing locks formed on the fixed rail to constrain movement of the moving rail.

One embodiment is a seat rail locking device including a guide bracket provided in the moving rail, a pair of locking units supported by the guide bracket, configured to move in an upward and downward direction, and arranged in a longitudinal direction, each locking unit including a plurality of locks selectively engaged with the fixing locks, and a fixing bracket configured to fix the locking unit to the moving rail.

Specifically, the locking units may include a first locking unit located on a front side and a second locking unit located on a rear side, and locks formed in the first locking unit may be in close contact with the fixing locks on the front side, and locks formed in the second locking unit may be in close contact with the fixing locks on the rear side.

Further, the plurality of locks is provided in plural in the longitudinal direction, and at least one of the plurality of locks may have inclined surfaces formed at both sides.

Further, the inclined surfaces of the at least one lock may be close contact with the fixing lock.

To this end, the locking unit may include a push bar having one end inserted through and disposed in the moving rail and the fixing bracket, a lock bracket fastened to the other end of the push bar and having the locks formed to be bent in a direction of the push bar, and an elastic member having one end supported by the guide bracket and the other end supported by a support flange formed to extend outwardly from the push bar and applying an elastic force such that the locks are engaged with the fixing locks.

Further, the fixing locks may be formed at both sides of the fixing rail in a longitudinal direction, and the locks may be formed at both sides of the lock bracket in the longitudinal direction.

In this case, the lock bracket may be disposed inside the moving rail, be positioned such that the locks pass through through-holes formed in the moving rail and engage the fixing locks by the elastic force of the elastic member, and be positioned to move downward when the push bar is pressed by an external force such that the locks are separated from the fixing locks.

According to the seat rail locking device of the present disclosure, it is possible to prevent a play between the locks and the fixing locks from occurring at locations where the locks of the lock unit provided in the moving rail are engaged with and locked to the fixing locks provided in the fixed rail. Further, it is possible to prevent BSR noise and damage to parts from occurring.

DETAILED DESCRIPTION

Hereinafter, embodiments will be described with reference to the accompanying drawings. Herein, when it is mentioned that a component (or an area, a layer, a part, etc.) is "on", "connected to", or "coupled to" another component, it may mean that the component may be directly connected/coupled to the other component or a third component may be disposed therebetween.

Hereinafter, preferred embodiments of the present disclosure will be described in detail with reference to the accompanying drawings.

Since the present disclosure can have various changes and various embodiments, specific embodiments are illustrated in the drawings and will be described in detail in the detailed description. This is not intended to limit the present disclosure to specific embodiments, and should be construed to include all modifications, equivalents, and substitutes included in the spirit and scope of the present disclosure.

The terminology used herein is for the purpose of describing particular embodiments only and is not intended to limit the present disclosure. As used herein, the singular forms "a," "an," and "the" are intended to include the plural forms as well, unless the context clearly indicates otherwise.

Unless otherwise defined, all terms including technical and scientific terms used herein have the same meaning as commonly understood by one of ordinary skill in the art to which the disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, specific embodiments of the present disclosure will be described with reference to the accompanying drawings.

Figure 1:
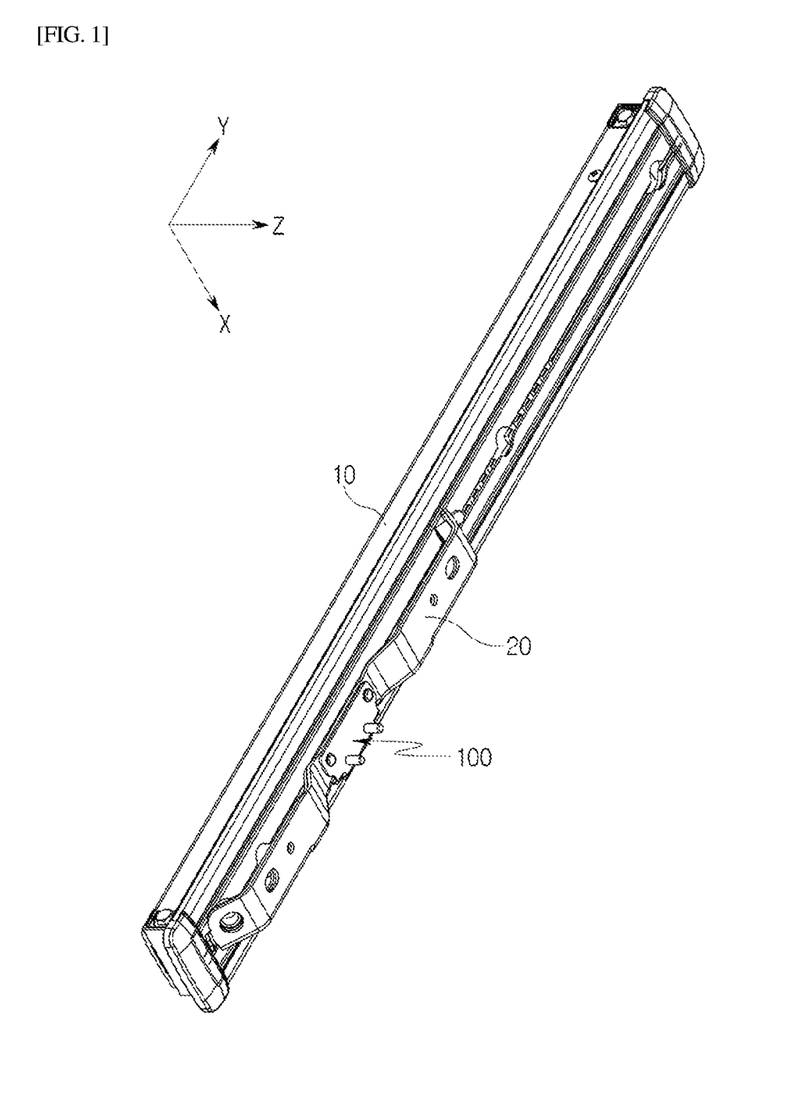
FIG. 1 is a perspective view schematically showing a seat rail locking device according to an embodiment of the present disclosure.
Figure 2:
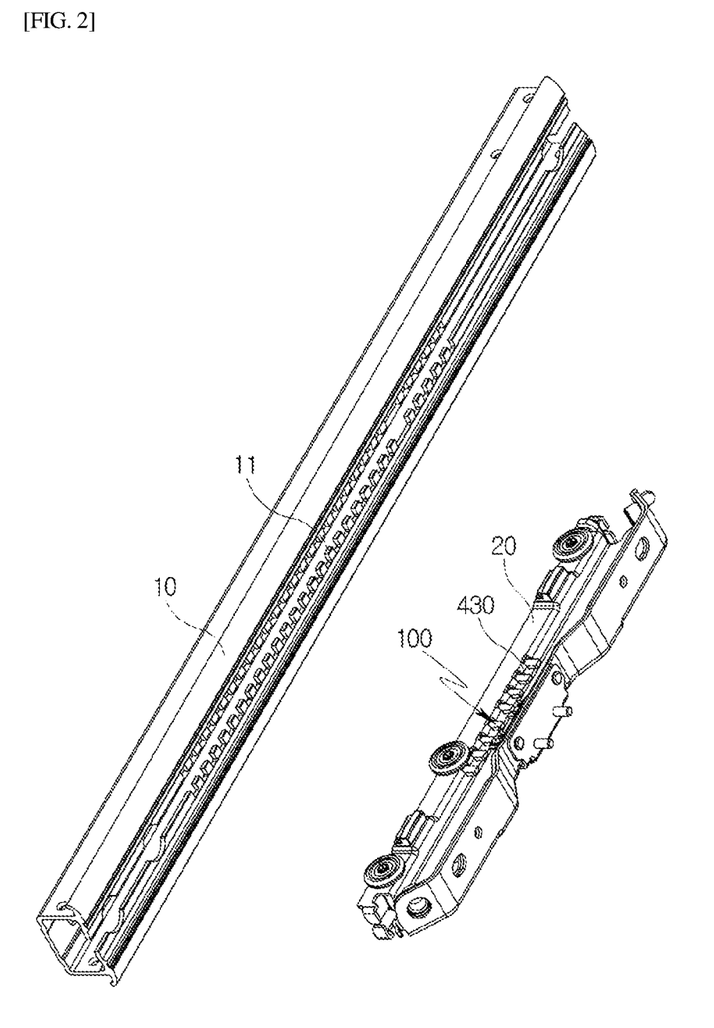
FIG. 2 is an exploded perspective view schematically showing the seat rail locking device according to the embodiment of the present disclosure.
Figure 3:
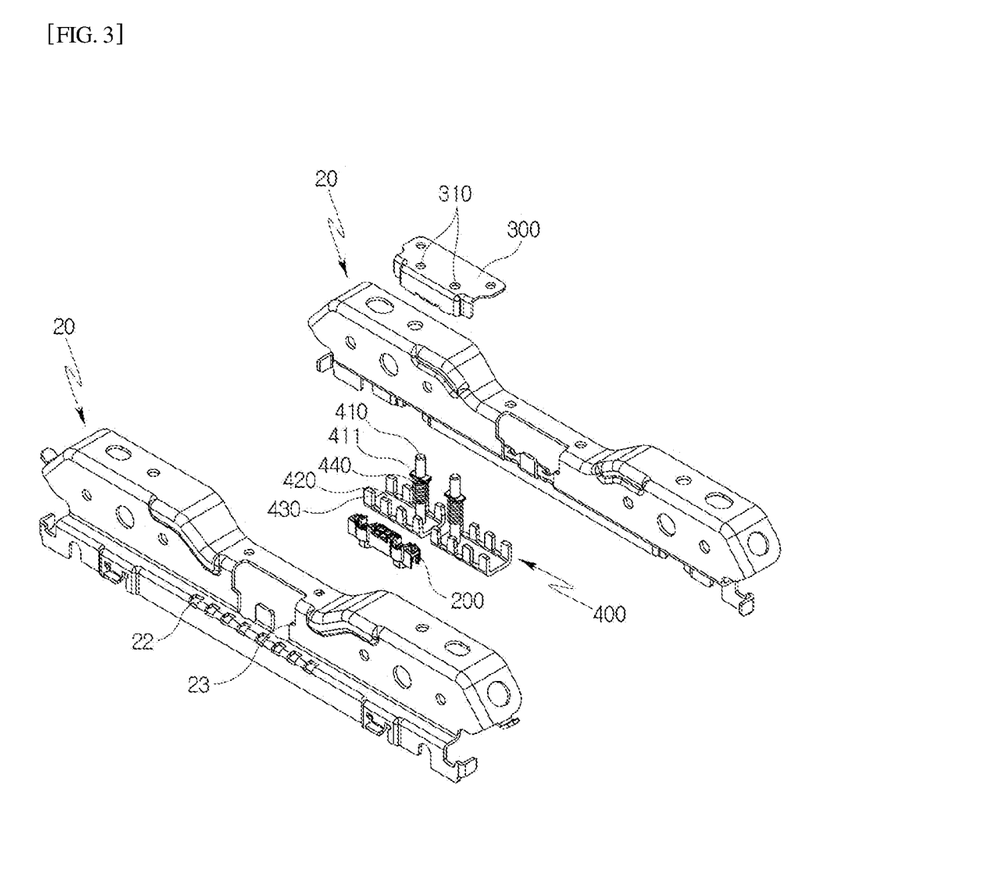
FIG. 3 is an exploded perspective view schematically showing a moving rail and a lock unit in the seat rail locking device according to the embodiment of the present disclosure.
Figure 4:
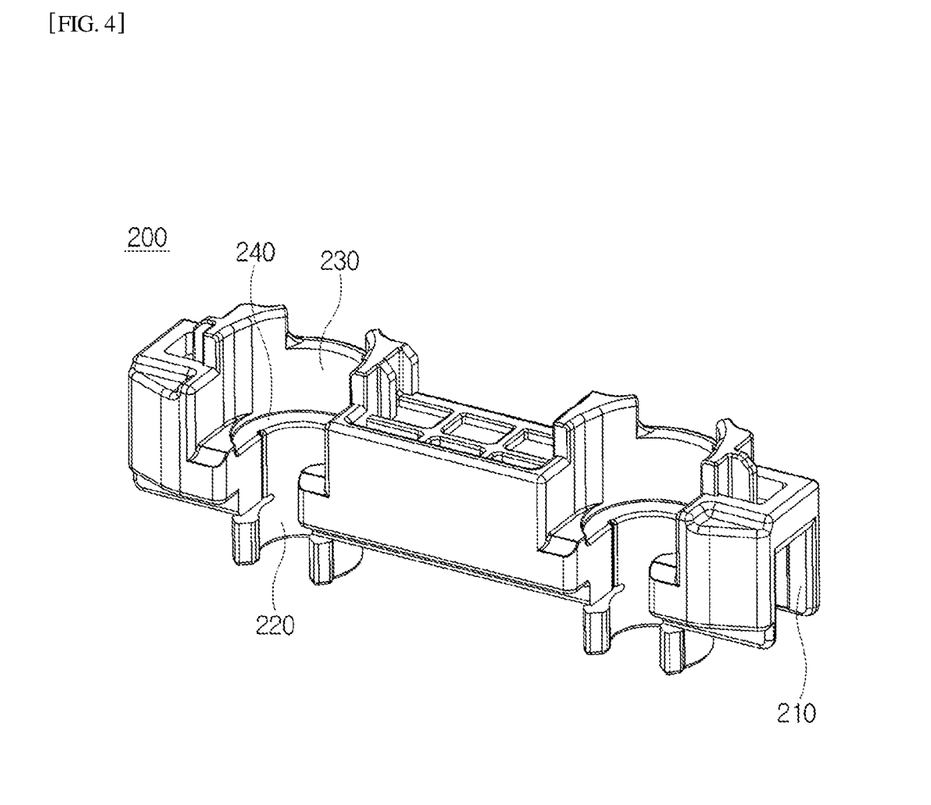
FIG. 4 is a perspective view schematically showing a guide bracket in the seat rail locking device according to an embodiment of the present disclosure.
Figure 5:
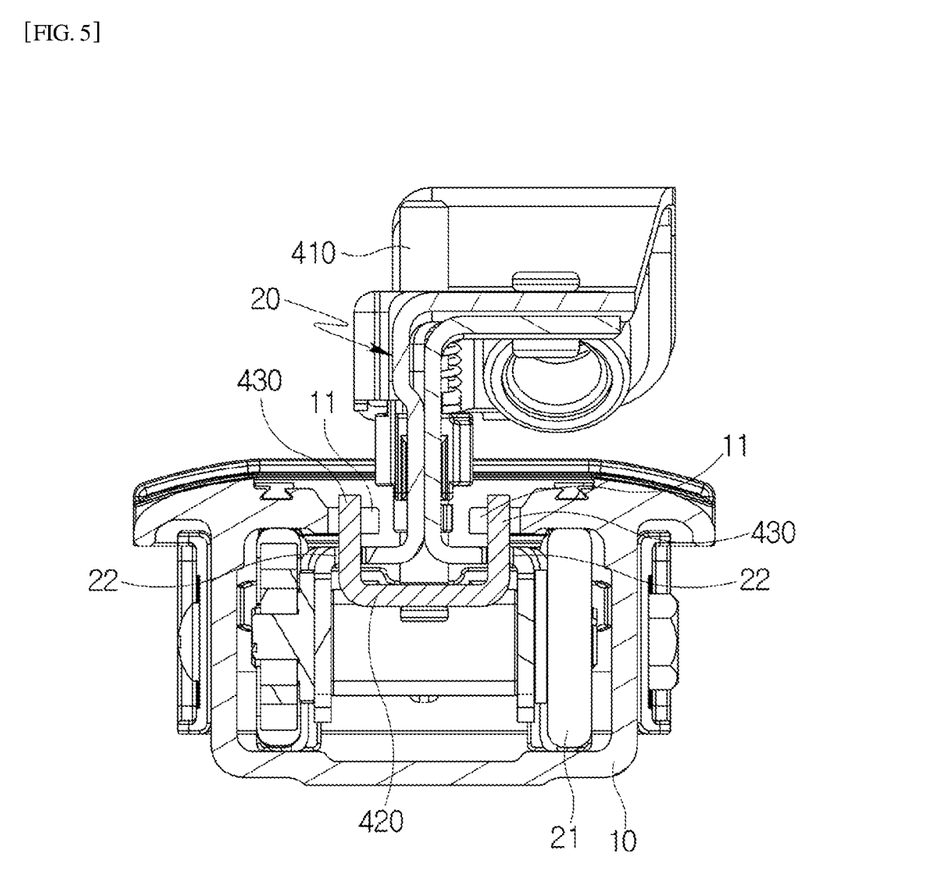
FIG. 5 is a cross-sectional view schematically showing the seat rail locking device in FIG. 1 taken along the X-axis direction.
Figure 6:
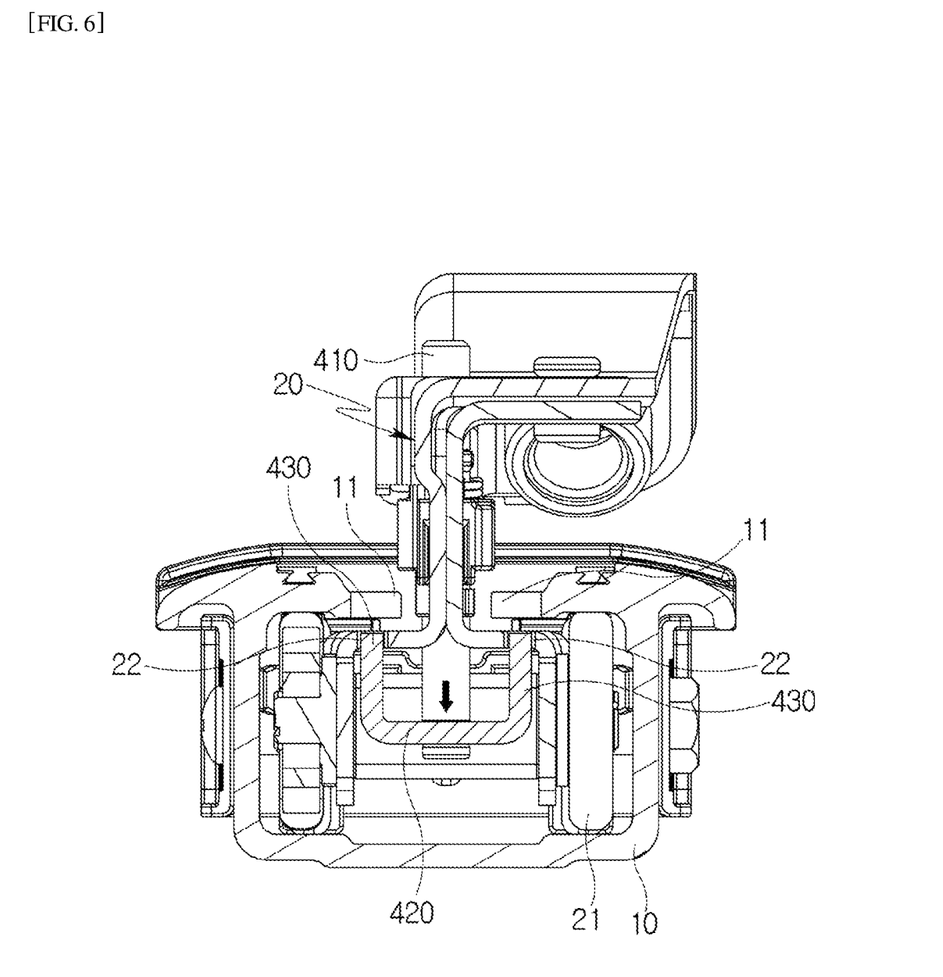
FIG. 6 is a cross-sectional view schematically showing a state in which a lock unit is moved and a lock is separated from a fixing lock in FIG. 5.
Figure 7:
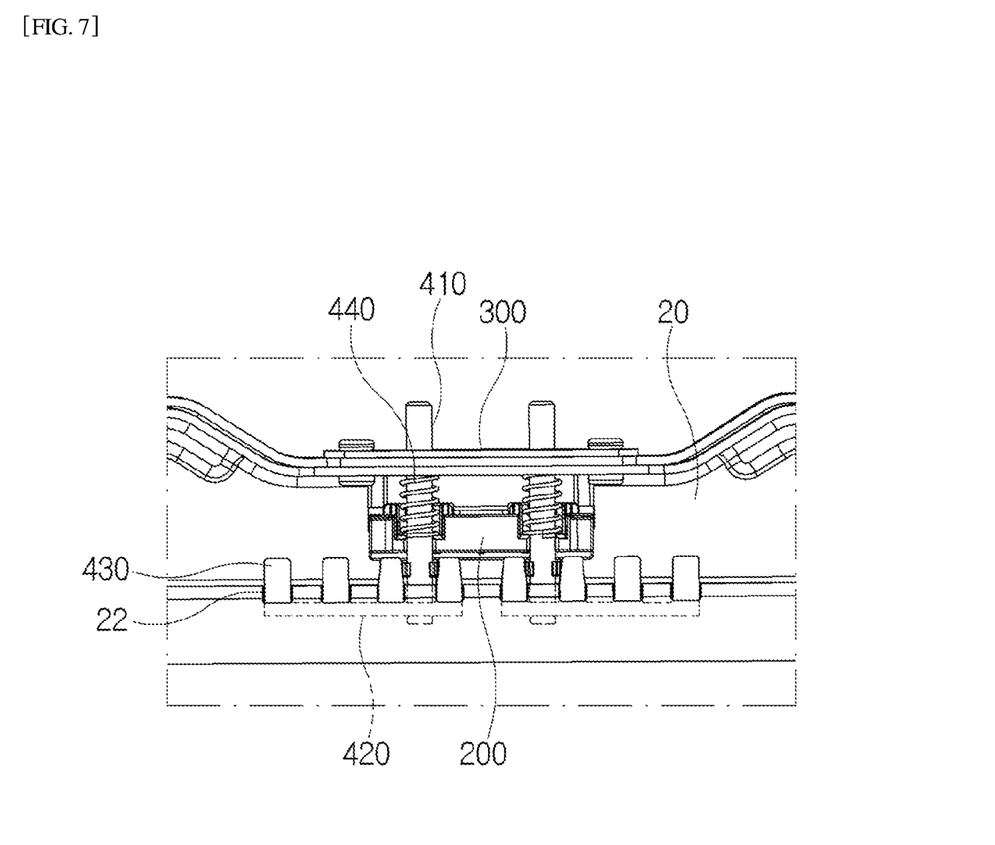
FIG. 7 is a partial front view schematically showing a lock unit provided in the moving rail in FIG. 2.
Figure 8:
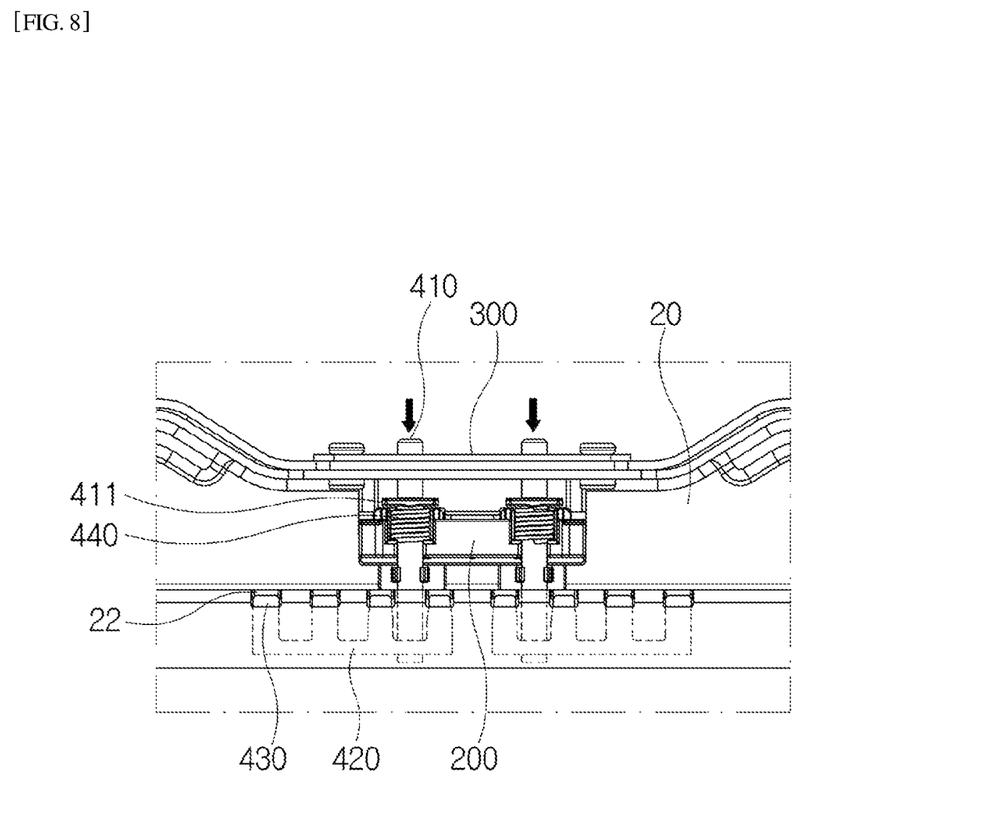
FIG. 8 is a cross-sectional view schematically illustrating a state in which a push bar is pressed and the lock moves downward in FIG. 7.
Figure 9:
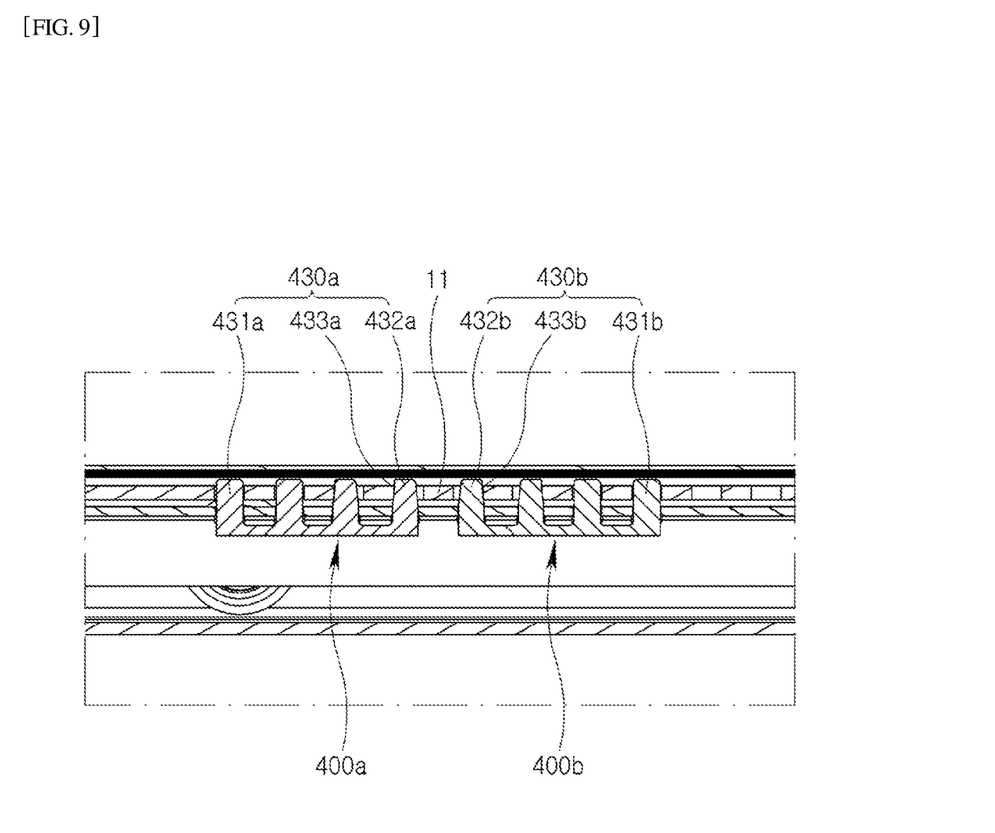
FIG. 9 is a cross-sectional view schematically showing the seat rail locking device in FIG. 1 taken along the Y-axis direction.
Figure 10:
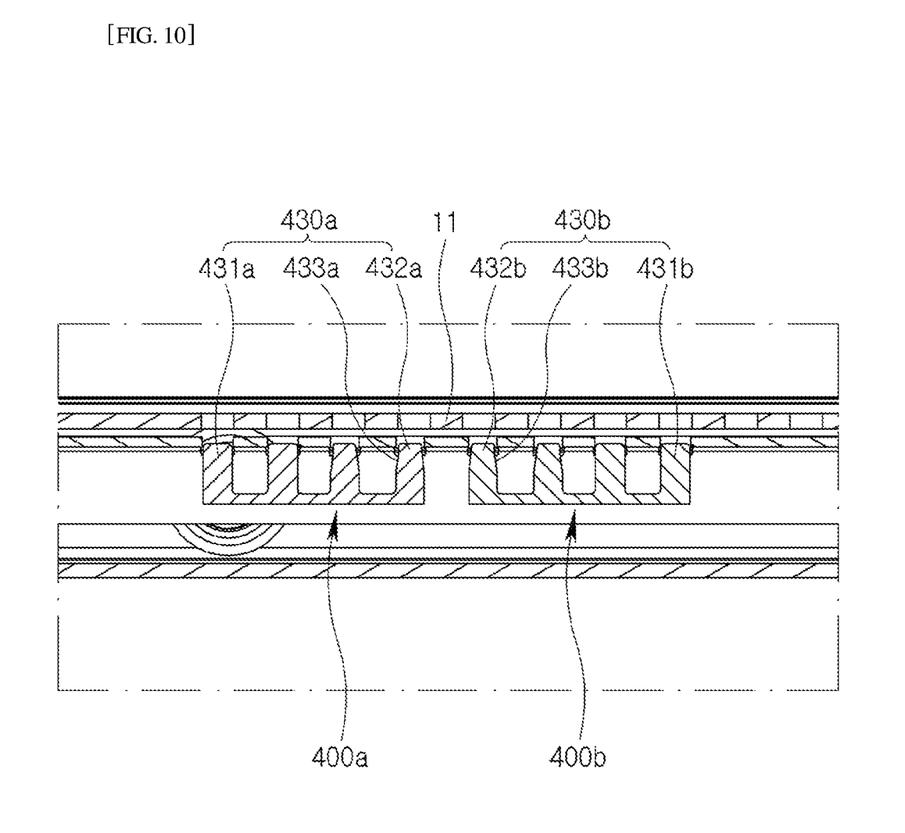
FIG. 10 is a cross-sectional view schematically showing a state in which a lock unit is moved and a lock is separated from a fixing lock in FIG. 9.

FIG. 1 is a perspective view schematically showing a seat rail locking device according to an embodiment of the present disclosure, FIG. 2 is an exploded perspective view schematically showing the seat rail locking device according to the embodiment of the present disclosure, FIG. 3 is an exploded perspective view schematically showing a moving rail and a lock unit in the seat rail locking device according to the embodiment of the present disclosure, and FIG. 4 is a perspective view schematically showing a guide bracket in the seat rail locking device according to an embodiment of the present disclosure. FIGS. 5 and 6 are cross-sectional views schematically showing the seat rail locking device in FIG. 1, taken along the X-axis direction, FIGS. 7 and 8 are front views schematically showing a lock unit provided in the moving rail in FIG. 2, and FIGS. 9 and 10 are cross-sectional views schematically showing the seat rail locking device in FIG. 1 taken along the Y-axis direction.

Referring to FIGS. 1 to 10, a seat rail locking device 100 according to an embodiment of the present disclosure is provided on a moving rail 20 moving along a fixed rail 10 and is engaged with a fixing lock 11 formed in the fixed rail 10 to constrain the movement of the moving rail 20.

The fixed rail 10 is installed on an indoor floor frame such that the longitudinal direction of the fixed rail 10 is arranged in the fore and aft direction of a vehicle. In addition, a plurality of fixing locks 11 are provided in the inside of the fixed rail 10 to be spaced apart from each other at predetermined intervals in the longitudinal direction.

In addition, the moving rail 20 may include a plurality of rollers 21 to move along the fixed rail 10, and the locking unit 400 is provided on the moving rail 20 to move with the moving rail 20. In addition, a plurality of through-holes 22 are formed in the moving rail 20 in the longitudinal direction such that locks 430 fixed by being engaged with the fixing locks 11 of the fixed rail 10 are able to be inserted therethrough.

That is, when a seat is moved in the fore and aft direction, the locks 430 of the seat rail locking device 100 are unlocked from the fixing locks 11. When the seat is moved and the position thereof is then fixed, the locks 430 of the seat rail locking device are engaged with and fastened to the fixing locks 11 to fix the position of the seat such that the seat is unable to move.

To this end, the seat rail locking device 100 may include a guide bracket 200 which is provided in the moving rail 20, a pair of locking units 400 which is supported by the guide bracket 200, configured to move in an upward and downward direction, and arranged in the longitudinal direction, each locking unit including a plurality of locks 430 selectively engaged with the fixing locks, and a fixing bracket 300 which is configured to fix the locking unit 400 to the moving rail 20.

Herein, the plurality of fixing locks 11 are formed to be spaced apart from each other at regular intervals in the longitudinal direction of the fixed rail 10, and the plurality of locks 430 are inserted into and locked to gaps between the fixing locks 11 and the fixing locks 11.

More specifically, the locking unit 400 may include a push bar 410 having one end inserted through and disposed in the moving rail 20 and the fixing bracket 300, a lock bracket 420 fastened to the other end of the push bar 410 and having the locks 430 formed to be bent in the direction of the push bar 410, and an elastic member 440 having one end supported by the guide bracket 200 and the other end supported by a support flange 411 formed to extend outwardly from the push bar 410 and applying an elastic force such that the locks 430 are engaged with the fixing locks 11.

With this configuration, the lock bracket 420 is moved upward by the elastic force of the elastic member 440, and in this case, the locks 430 pass through the through-holes 22 of the moving rail 20 and are engaged with the fixing locks 11 of the fixed rail 10 to achieve position fixing, that is, to be locked. Further, when the push bar 410 is pressed downward by an external force, the lock bracket 420 is moved downward, and in this case, the locks 430 are separated from the fixing locks 11 to be unlocked. That is, the locks 430 are locked when moving in an upward direction, and are unlocked when moving in a downward direction.

In addition, the guide bracket 200 is provided on the moving rail 20, and supports the locking unit 400 to move in the upward and downward direction on the moving rail 20.

Specifically, the guide bracket 200 may include moving rail fastening grooves 210 formed at both sides of the guide bracket 200 such that fastening protrusions 23 formed in the moving rail 20 are inserted into and fastened to the fastening grooves 210 in a form fitting manner, a push bar guide hole 220 configured to guide the push bar 410 of the locking unit 400 to be inserted into and moved in the upward and downward direction, and an elastic member insertion groove 230 formed to have a larger diameter than the push bar guide hole 220, the elastic member 440 being inserted into elastic member insertion groove 230. Herein, the elastic member 440 is supported on a stepped portion 240 formed between the push bar guide hole 220 and the elastic member insertion groove 230.

In addition, the guide bracket 200 may include a pair of push bar guide holes 220 and a pair of elastic member insertion grooves 230, so that the pair of locking units 400 are respectively fastened to the pair of push bar guide holes 220 and the pair of elastic member insertion grooves 230.

The fixing bracket 300 is configured to fasten and fix the locking unit 400 fastened to the guide bracket 200 so as not to be separated from the moving rail 20.

Specifically, the fixing bracket 300 is formed in the form of a plate and fastened to the upper surface of the moving rail 20 and has a push bar support hole 310 through which one end of the push bar 410 is inserted into and which supports the push bar 410 so as not to be separated from the moving rail 20.

In addition, the fixing bracket 300 has a pair of the push bar support holes 310, so that the pair of the locking units 400 may be fastened to the pair of the push bar support holes, respectively.

In the present disclosure, the pair of locking units 400 are provided, and the pair of locking units 400 are arranged in the longitudinal direction, which is the movement direction of the moving rail 20, and the locks 430 provided in each locking unit 400 is doubly engaged with the fixing locks 11 provided in the fixed rail 10. In this case, the lock 430 is engaged with and fastened to the fixing lock 11 such that a plays between the lock 430 and the fixing lock 11 does not occur.

For example, referring to FIGS. 9 and 10, the locking units 400 include a first locking unit 400 positioned on the front side and a second locking unit 400 positioned on the rear side, and the locks 430 formed in the first locking unit 400 may be in close contact with the fixing locks 11 on the front side, and the locks 430 formed in the second locking unit 400 may be in close contact with the fixing locks 11 on the rear side. Accordingly, it is possible to prevent a play from occurring at a location where the locks 430a and 430b and the fixing locks 11 are fastened to each other.

In addition, a plurality of locks 430a and 430b are provided in the longitudinal direction. In this case, some of the plurality of locks 430a and 430b are locks 431a and 431b without an inclined surface, and the rest of the plurality of locks 430a and 430b are locks 432a and 432b with inclined surfaces 433a at both sides. Here, the fixing locks 11 are closely engaged with the inclined surfaces 433a and 433b.

Specifically, when the locks 430a and 430b are inserted between the fixing locks 11 while moving, the fixing lock 11 is in close contact with the inclined surface 433a formed at the front of the lock 430a having the inclined surface 433a among the locks 430a formed in the first lock unit 400a and the fixing lock 11 is in close contact with the inclined surface 433b formed at the rear of the lock 430a having the inclined surface 433b among the locks 430b formed in the second lock unit 400b. Accordingly, it is possible to more effectively prevent a play from occurring at locations where the locks 430a and 430b and the fixing locks 11 are fastened to each other. In this case, the pair of locking units 400 are provided as an example, and a larger number of locking units 400 may be provided as needed.

Referring to FIGS. 5 and 6, the fixing locks 11 may be formed at both sides of the fixed rail 10 in the longitudinal direction, and correspondingly, the locks 430 may be formed at both sides of the lock bracket 420 in the longitudinal direction.

In addition, the lock bracket 420 is disposed inside the moving rail 20, and may be positioned such that the locks 430 engage the fixing locks 11 by passing through the through-holes 22 formed in the moving rail 20 by the elastic force of the elastic member 440 as shown in FIG. 5. Further, as shown in FIG. 6, the lock bracket 420 may be positioned to move downward when the push bar 410 is pressed by an external force such that the locks 430 are separated and unlocked from the fixing locks 11.

As described above, the plurality of fixing locks 11 and the plurality of locks 430 are provided at both left and right sides in the longitudinal direction, thus minimizing the occurrence of a play between the locks 430 and the fixing locks 11. In addition, the locking force may be further strengthened and the occurrence of shaking of the seat may be more effectively prevented.

Although the present disclosure has been described in detail through specific embodiments, it is intended to describe the present disclosure in detail, and the present disclosure is not limited thereto. It is apparent that the present disclosure can be modified or improved by those skilled in the art within the technical spirit of the present disclosure.

All simple modifications or changes of the present disclosure fall within the scope of the present disclosure, and the specific scope of protection of the present disclosure will be made apparent by the appended claims

| REFERENCE NUMERALS | |
| --- | --- |
| 10: Fixed Rail | 11: Fixing Lock |
| 20: Moving Rail | 21: Roller |
| 22: Through-hole | 23: Fastening Protrusion |
| 100: Seat Rail Locking Device | 200: Guide Bracket |
| 210: Moving Rail Fastening Groove | 220: Push Bar Guide Hole |
| 230: Elastic Member Insertion Groove | 240: Stepped Portion |
| 300: Fixing Bracket | 310: Push Bar Support Hole |
| 400: Lock Unit | 410: Push Bar |
| 411: Support Flange | 420: Lock Bracket |
| 430: Lock | 440: Elastic Member |

What is claimed is:

1. A seat rail locking device being provided on a moving rail moving along a fixed rail and engaged with fixing locks formed on the fixed rail to constrain movement of the moving rail, the seat rail locking device comprising:
   a guide bracket provided in the moving rail;
   a pair of locking units supported by the guide bracket, configured to move in an upward and downward direction, and arranged in a longitudinal direction, each locking unit comprising a plurality of locks selectively engaged with the fixing locks, and
   a fixing bracket configured to affix the pair of locking units to the moving rail;

wherein the pair of locking units each comprise:
- a push bar having one end inserted through and disposed in the moving rail and the fixing bracket;
- a lock bracket fastened to the other end of the push bar and having the locks formed to protrude in a direction of the push bar; and
- an elastic member having one end supported by the guide bracket and the other end supported by a support flange formed to extend outwardly from the push bar, wherein the elastic member applies an elastic force such that the locks are engaged with the fixing locks.

2. The seat rail locking device of claim 1,
wherein the locking units comprises a first locking unit located on a front side and a second locking unit located on a rear side,
wherein locks formed in the first locking unit are in close contact with the fixing locks on the front side,
and wherein locks formed in the second locking unit are in close contact with the fixing locks on the rear side.

3. The seat rail locking device of claim 2,
wherein a plurality of locks is provided in the longitudinal direction, and
wherein at least one of the plurality of locks has inclined surfaces formed at both sides.

4. The seat rail locking device of claim 3, wherein the inclined surfaces of the at least one lock are close contact with the fixing lock.

5. The seat rail locking device of claim 1,
wherein the fixing locks are located at both sides of the fixed rail in the longitudinal direction,
and wherein the locks are located at both sides of the lock bracket in the longitudinal direction.

6. The seat rail locking device of claim 5,
wherein the lock bracket is disposed inside the moving rail,
wherein the lock bracket is positioned such that the locks pass through through-holes formed in the moving rail and engage the fixing locks by the elastic force of the elastic member, and wherein the lock bracket is positioned to move downward when the push bar is pressed by an external force such that the locks are separated from the fixing locks.

* * * * *